United States Patent Office 3,244,593
Patented Apr. 5, 1966

3,244,593
PHARMACEUTICALLY ACTIVE SUBSTITUTED
5-PYRAZOLONES
Karl Schoen, Kew Gardens, N.Y., assignor to Endo Laboratories Inc., Richmond Hill, N.Y., a corporation of New York
No Drawing. Filed June 12, 1963, Ser. No. 287,204
4 Claims. (Cl. 167—65)

This invention relates to a new class of substituted 5-pyrazolones. More particularly, it is directed to novel pyrazolones having the formula:

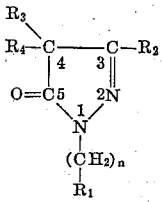

In this formula:

$n$ stands for an integral number 1, 2 or 3;
$R_1$ stands for a radical selected from the group of 2, 3 or 4-pyridyl (or substituted pyridyl) and 2, 3 or 4-piperidyl (or substituted piperidyl);
$R_2$ stands for a radical selected from the group consisting of H, lower alkyl (such as methyl, ethyl, propyl, butyl), aryl or substituted aryl, aralkyl or substituted aralkyl, amino and substituted amino, etc.;
$R_3$ and $R_4$ stand for radicals selected from the group consisting of H, lower alkyl, aryl and substituted aryl, aralkyl and substituted aralkyl, acyl (e.g., acetyl, benzoyl), nitroso, nitro, halogen, amino, alkylamino, etc.

Among the several thousand pyrazolones described in the literature, there is not one which has a pyridylalkyl group in position 1— or any other position. Although piperidylalkyl pyrazolones have already been described, none of them bears the piperidylalkyl group in 1— position of the pyrazolone ring.

The new pyridylalkyl pyrazolones are obtained from pyridylalkylhydrazines by condensation with acetoacetic ester and substituted acetoacetic esters, benzoylacetic and substituted benzoylacetic esters, cyanoacetic and substituted cyanoacetic esters, according to methods described in literature. The pyridylalkylhydrazines, some of which are new compounds, were prepared from the respective haloalkylpyridines by reaction with hydrazine, or in the case of pyridylethyl hydrazines from the respective vinylpyridines and hydrazine.

Another way of preparing the pyridylalkyl pyrazolones of the present invention consists in reacting 2-pyrazolin-5-ones of the formula:

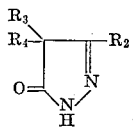

with halogenoalkyl-pyridines of the formula

Hal-$(CH_2)_n$—$R_1$ in the presence or absence of acid binding compounds. In these formulae, $R_1$, $R_2$, $R_3$, $R_4$ and $n$ have the same significance as in the formula above.

The piperidylalkyl pyrazolones were prepared from the respective pyridyl-derivatives by catalytic hydrogenation in neutral or acid solution.

The new compounds of the present invention are useful in a number of important fields. Some of them have valuable pharmacological properties. 1-[2-(2-pyridyl)-ethyl] - 3 - phenyl - 5-pyrazolone (Example 7) and 1-(3-pyridylmethyl) - 3 - phenyl - 5 - pyrazolone (Example 14) have analgesic and anti-pyretic action. Others are sedatives, e.g., 1 - (2 - pyridylmethyl) - 3-phenyl-5-pyrazolone (Example 13) and 1 - [2 - (2 - pyridyl)ethyl]-3-benzyl-4-phenyl-5-pyrazolone (Example 10). Still others, e.g., 1-[2-(2-piperidyl)ethyl]-3-phenyl-5-pyrazolone (Example 11) show spasmolytic activity.

The new pyrazolones are also important and useful as intermediates for dyestuffs and drugs, and as solubilizers for insoluble drugs and other chemical compounds. The sulfonamides prepared from amino-pyrazolones of this invention have bacteriostatic and bactericidal properties while the amino compounds themselves may be useful as photographic developers in color photography.

The following examples are illustrative of this invention:

THE PYRIDYLALKYL HYDRAZINES

The pyridylmethyl- and pyridylpropyl-hydrazines used as starting materials for the synthesis of the new pyrazolones were prepared from the respective pyridinecarbinols and pyridinepropanols by reacting them with thionyl chloride. The halopyridines thus formed were then refluxed with an excess of hydrazine and the hydrazines formed isolated by fractionated distillation in vacuo. 2-(4-pyridyl) ethylhydrazine was prepared from 4-vinylpyridine according to the method described in U.S. Patent 3,012,-032. The 2-(2-pyridyl) ethylhydrazine was perpared in an analogous manner from 2-vinylpyridine.

The pyridylalkyl hydrazines, some of which have been described before, are colorless to pale yellow oils with amine odor, soluble in water, alcohol and chloroform. The following were prepared:

|  | Degrees |
|---|---|
| 2-pyridylmethylhydrazine, B.$_2$ | 83– 86 |
| 3-pyridylmethylhydrazine, B.$_{0.5-1}$ | 96–100 |
| 4-pyridylmethylhydrazine, B.$_{1-2}$ | 126–130 |
| 2-(2-pyridyl)ethylhydrazine, B.$_{12}$ | 143–146 |
| 2-(4-pyridyl)ethylhydrazine, B.$_{.5}$ | 139–142 |
| 3-(4-pyridyl)propylhydrazine, B.$_{2-3}$ | 120–126 |

THE PYRAZOLONES

*Example 1.—1-[2-(4-pyridyl)ethyl]-3-methyl-5-pyrazolone*

2-(4-pyridyl)ethylhydrazine (120 gm.) dissolved in 125 ml. anhydrous ethanol was mixed with 114 gm. ethyl acetoacetate. The mixture became hot spontaneously and began boiling within 30 seconds. After the first reaction had subsided, the solution was refluxed for 90 minutes. On standing at room temperature, the pyrazolone crystallized out. It was recrystallized from ethanol; M.P. 149.4–149.7°.

The substance is soluble in water; a 1% aqueous solution has pH 6.2.

$C_{11}H_{13}N_3O$—Mol. wt.: 203.23. Calc.: C, 65.00%; H, 6.45%; N, 20.68%. Found: C, 65.10%; H, 6.60%; N, 20.23%.

A dihydrochloride was prepared by dissolving the compound in ethanol and adding gaseous HCl. On standing in a refrigerator, the salt crystallized. It was recrystallized from a mixture of anhydrous ethanol and ethyl acetate; M.P. 206.1–206.7°.

$C_{11}H_{13}N_3O \cdot 2HCl$—Mol. wt.: 275.16. Calc.: Cl, 25.68%. Found: Cl, 25.21%.

*Example 2.—1-[2-(4-piperidyl)ethyl]-3-methyl-5-pyrazolone*

The hydrochloride described in Example 1 was dissolved by warming in 90% aqueous ethanol and hydrogenated in a Parr apparatus at 50° C. and 60 lbs./sq. in.

pressure with PtO$_2$ catalyst. Hydrogen absorption was slow and was completed in about 24 hours. The catalyst was filtered off and the solution evaporated to dryness in vacuo under nitrogen. The hygroscopic residue was crystallized from a mixture of anhydrous ethanol and acetone. The substance contains solvent of crystallization. On heating it melts partially at 125–130°, losing its solvent, solidifies again and melts with decomposition at 173°.

C$_{11}$H$_{19}$N$_3$O.2HCl—Mol. wt.: 282.21. Calc.: C, 46.81%; H, 7.50%; Cl, 25.13%. Found: C, 46.81%; H, 7.37%; Cl, 24.88%.

*Example 3.—1-[2-(4-pyridyl)ethyl]-3-phenyl-5-pyrazolone*

Equimolar amounts of 2-(4-pyridyl)ethylhydrazine and ethyl benzoylacetate were mixed in anhydrous ethanol. The solution heated spontaneously and after the first reaction subsided, was refluxed for 4 hours. On standing at room temperature, the compound crystallized slowly. It was recrystallized from ethanol; M.P. 141.0–141.4°. The substance is only slightly soluble in water. It is readily soluble in dilute acids and alkalis.

C$_{16}$H$_{15}$N$_3$O—Mol. wt.: 265.30. Calc.: N, 15.84%. Found: N, 15.80%.

*Example 4.—1-[2-(4-pyridyl)ethyl]-3,4-dimethyl-5-pyrazolone*

2-(4-pyridyl)ethylhydrazine (47.5 gm.) and 50 gm. ethyl alpha-methylacetoacetate were mixed with 50 ml. anhydrous ethanol. The mixture heated up spontaneously and came to reflux within 3–4 minutes. Subsequently the solution was refluxed for 2 hours. To the solution kept in the refrigerator overnight was added 100 ml. anhydrous ether. On standing in the cold, a mixture of crystals and a red oil separated. It was filtered, the mass on the filter washed with acetone which removed the oil, and the crystals recrystallized from hot ethanol by addition of acetone; M.P. 127–128.5°. The compound is very soluble in water.

C$_{12}$H$_{15}$N$_3$O—Mol. wt.: 217.26. Calc.: C, 66.33%; H, 6.96%; N, 19.34%. Found: C, 66.45%; H, 7.18%; N, 19.20%.

*Example 5.—1-[2-(4-pyridyl)ethyl]-3-benzyl-4-phenyl-5-pyrazolone*

Ethyl alpha-gamma-diphenylacetoacetate 28.2 gm. (0.1 mole) (prepared according to Conant and Blatt, J. Am. Chem. Soc. 51, 1227) and 13.7 gm. (0.1 mole) 2-(4-pyridyl)ethylhydrazine were refluxed in 100 ml. anhydrous ethanol for 48 hours. On standing at room temperature, the compound crystallized. After recrystallization from ethanol, the M.P. was 155.5–156.5°.

C$_{23}$H$_{21}$N$_3$O—Mol. wt.: 355.42. Calc.: C, 77.72%; H, 5.96%; N, 11.82%. Found: C, 77.95%; H, 6.09%; N, 11.82%.

*Example 6.—1-[2-(2-pyridyl)ethyl]-3-methyl-5-pyrazolone*

Reaction of 2-(2-pyridyl)ethylhydrazine with ethylacetoacetate analogous to the reaction described in Example 1 gave the pyrazolone M.P. 122–127°. Soluble in water a 1% solution had pH 6.0.

C$_{11}$H$_{13}$N$_3$O—Mol. wt.: 203.23. Calc.: C, 65.00%; H, 6.45%; N, 20.68%. Found: C, 65.32%; H, 6.43%; N, 20.72%.

The dihydrochloride was prepared as described in Example 1. It has M.P. 184.0–184.5°.

C$_{11}$H$_{13}$N$_3$O.2HCl — Mol. wt.: 276.16. Calc.: Cl, 25.68%. Found: Cl, 25.51%.

*Example 7.—1-[2-(2-pyridyl)ethyl]-3-phenyl-5-pyrazolone*

This compound was prepared from 2-(2-pyridyl)ethylhydrazine and ethyl benzoylacetate and crystallized from ethanol; M.P. 147.7–148.4°. Difficultly soluble in water, soluble in dilute acids and alkalis.

C$_{16}$H$_{15}$N$_3$O—Mol. wt.: 265.30. Calc.: C, 72.43%; H, 5.70%; N, 15.84%. Found: C, 72.28%; H, 5.96%; N, 15.73%.

*Example 8.—1-[2-(2-pyridyl)ethyl]-3,4-dimethyl-5-pyrazolone*

Prepared from 2-(2-pyridyl)ethylhydrazine and ethyl alpha-methylacetoacetate. Crystallized from anhydrous ethanol and ether; M.P. 146.5–147.2°. The compound is very soluble in water and ethanol, insoluble in ether.

C$_{12}$H$_{15}$N$_3$O—Mol. wt.: 217.26. Calc.: C, 66.33%; H, 6.96%; N, 19.34%. Found: C, 66.43%; H, 7.16%; N, 19.40%.

*Example 9.—1-[2-(2-piperidyl)ethyl]-3-phenyl-5-pyrazolone*

This compound was obtained from 1-(2-(2-pyridyl)ethyl)-3-phenyl-5-pyrazolone (Example 7) by dissolving 13.26 gm. (0.05 mole) in 100 ml. ethanol, adding a mixture of 10 ml. conc. HCl and 10 ml. H$_2$O, 100 mg. PtO$_2$ and hydrogenating in a Parr apparatus at 50° and 60 lbs. Hydrogenation was completed in 5 hours. The solution was freed of the catalyst by filtration, brought to dryness in vacuo under nitrogen, the residue taken up in anhydrous ethanol, brought to dryness in vacuo and this procedure repeated once more. The residue was kept in a vacuum desiccator over KOH for 1 week during which it crystallized partly. It was recrystallized from a small amount of anhydrous ethanol and dried, in high vacuum over P$_2$O$_5$; M.P. unsharp, 208–216°.

C$_{16}$H$_{21}$N$_3$O.2HCl — Mol. wt.: 344.28. Calc.: Cl, 20.59%. Found: Cl, 20.36%.

*Example 10.—1-[2-(2-pyridyl)ethyl]-3-benzyl-4-phenyl-5-pyrazolone*

To a solution of 2.3 gm. sodium (0.1 mole) in 70 ml. anhydrous ethanol was added 28.2 gm. (0.1 mole) ethyl alpha-gamma-diphenylacetoacetate and 13.7 gm. 2-(2-pyridyl)ethylhydrazine (0.1 mole). The mixture was refluxed for 24 hours and the alcohol distilled off under nitrogen in vacuo. The white residue was taken up in a small volume hot water. On cooling a crystalline precipitate formed which was filted and washed with a small amount ice cold water. This compound was found to be the Na salt of the 2-(2-pyridyl)ethylhydrazone of 2,4-diphenyl-3-keto-butyric acid. Upon neutralization with dilute hydrochloric acid, the compound cyclized to the desired pyrazolone which, upon recrystallization from ethanol, melted at 151–152°.

C$_{23}$H$_{20}$N$_3$O—Mol. wt.: 355.42. Calc.: C, 77.72%; H, 5.96%; N, 11.82%. Found: C, 77.66%; H, 6.24%; N, 11.81%.

*Example 11.—1-[2-(2-pyridyl)ethyl]-3-amino-5-pyrazolone*

Ethyl cyanoacetate 22.6 gm. (0.2 mole) and 27.4 gm. (0.2 mole) 2-(2-pyridyl)ethylhydrazine were heated together in an oil bath. At 110–120° the liquid began to boil giving off ethanol. Heating was continued at 130° for 1 hour. The residue was taken up in the smallest possible amount of hot water. On cooling the compound crystallized. It was recrystallized from water. Slightly soluble in cold, soluble in hot water. Very soluble in methanol, ethanol, dilute acids and alkalis.

C$_{10}$H$_{12}$N$_4$O—Mol. wt.: 204.23. Calc.: C, 58.81%; H, 5.92%; N, 27.43%. Found: C, 58.37%; H, 6.14%; N, 27.20%.

*Example 12.—1-[2-(2-pyridyl)ethyl]-3-(2,2,2-trichloro-1-hydroxyethylamino)-5-pyrazolone*

1-(2-(2-pyridyl)ethyl)-3-amino-5-pyrazolone (Example 11) 20.4 gm. (0.1 mole) and 16.5 gm. (0.1 mole) chloral hydrate were dissolved together in 100 ml. hot ethanol. On standing at room temperature, the compound crystallized. Colorless crystals with bitter taste. Soluble in dilute HCl. Decomposes in alkaline solutions with formation of chloroform; M.P. 141°.

$C_{12}H_{13}Cl_3N_4O_2$—Mol. wt.: 351.62. Calc.: Cl, 30.25%; N, 15.93%. Found: Cl, 29.29%; N, 15.91%.

Example 13.—1-[(2-pyridyl)methyl]-3-phenyl-5-pyrazolone

Prepared from 2-pyridylmethylhydrazine and ethyl benzoylacetate. Crystals from ethanol, M.P. 157.0–157.5°. Soluble in dilute acids and alkalis.

$C_{15}H_{13}N_3O$—Mol. wt.: 251.27. Calc.: C, 71.70%; H, 5.21%; N, 16.72%. Found: C, 71.94%; H, 5.42%; N, 16.53%.

Example 14.—1-[(3-pyridyl)methyl]-3-phenyl-5-pyrazolone

Prepared from 3-pyridylmethylhydrazine and ethyl benzoylacetate. Crystals from ethanol; M.P. 170–170.5°. Soluble in dilute acids and alkalis.

$C_{15}H_{13}N_3O$—Mol. wt.: 251.27. Calc.: C, 71.70%; H, 5.21%; N, 16.72%. Found: C, 71.98%; H, 5.43%; N, 16.84%.

Example 15.—1-[3-(4-pyridyl)propyl]-3-phenyl-5-pyrazolone

Prepared from 3-(4-pyridyl)propylhydrazine and ethyl benzoylacetate by refluxing in ethanol solution for 2 hours. Crystallized from ethanol; M.P. 177–178°. Soluble in dilute acids and alkalis.

$C_{17}H_{17}N_3O$—Mol. wt.: 279.33. Calc.: C, 73.09%; H, 6.14%; N, 15.04%. Found: C, 73.14%; H, 6.46%; N, 15.04%.

Example 16.—1-[2-(2-pyridyl)ethyl]-3-phenyl-4-bromo-5-pyrazolone hydrobromide 53.0 gm. 1-(2-(2-pyridyl)ethyl)-3-phenyl-5-pyrazolone (0.2 mole) (Example 7) was dissolved in 150 ml. glacial acetic acid and 33.4 gm. (0.21 mole) bromine added dropwise with efficient stirring in the course of 10 minutes. The bromine reacted instantly and the solution warmed up slightly. After stirring for 30 minutes, a crystalline precipitate formed. It was filtered off, washed with glacial acetic acid, then with acetone and dried in a desiccator; M.P. 139.2–140.4°. Yield 82 gm.=96% of theory.

$C_{16}H_{14}BrN_3O \cdot HBr$—Mol. wt.: 425.14. Calc.: HBr, 19.06%. Found: HBr, 19.19%.

The compound is very soluble in water. The bromine is quite reactive. When crystallized from boiling acetic acid, the compound changes into a mixture of 2 compds., one soluble in water, the other deep yellow difficulty soluble in water. The soluble compound proved to be the dihydrobromide of the starting material: 1-(2-(2-pyridyl)ethyl)-3-phenyl-5-pyrazolone.2HBr; M.P. 265–7°.

$C_{16}H_{15}N_3O \cdot 2HBr$—Mol. Wt.: 427.14. Calc.: HBr, 37.89%. Found: HBr, 37.27%.

Example 17.—1-[(2-piperidyl)methyl]-3-phenyl-5-pyrazolone dihydrochloride

Ten grams of 1-(2-pyridyl)methyl-3-phenyl-5-pyrazolone (Example 13) were dissolved in a mixture of 100 ml. ethanol and 20 ml. of 5 N hydrochloric acid, 100 mg. $PtO_2$ (Adam's catalyst) were added and the mixture shaken in a Parr apparatus at 50° C. and 60 lbs./sq. in. hydrogen pressure. Hydrogen absorption was completed in 5 hours. The catalyst was filtered off and the solution concentrated in vacuo on a steam bath to dryness. The colorless crystalline residue was dissolved in the smallest possible volume of hot water, filtered and 10 volumes acetone added slowly with stirring. The hydrochloride salt crystallized. It is very soluble in water, slightly soluble in ethanol, insoluble in acetone and ether; M.P. 223–25° (with decomposition).

$C_{15}H_{19}N_3O$—Mol. wt.: 330.25. Calc.: C, 54.54%; H, 6.41%; Cl, 21.47%. Found: C, 54.71%; H, 6.55%; Cl, 21.30%.

Example 18.—1-[2-(4-pyridyl)ethyl]-3-phenyl-4-benzyl-5-pyrazolone

Ethyl α-benzoyl-β-phenylpropionate 28.2 gm. (0.1 mole) [prepared according to Perkin and Stenhouse, J. Chem. Soc. (London 59, 1006 (1891)] and 13.7 gm. 2-(4-pyridyl) ethyl hydrazine were refluxed in 50 ml. anhydrous ethanol for 120 hours. After standing 5 days at room temperature, crystals formed which were filtered off and recrystallized from small volumes of ethanol to a constant melting point of 156.5–157.0°. Yield 5 gm.

$C_{23}H_{21}N_3O$—Mol. wt.: 355.42. Calc.: C, 77.72%; H, 5.96%; N, 11.82%. Found: C, 77.91%; H, 5.94%; N, 11.54%.

Example 19.—1-(6-methyl-2-pyridyl)methyl-3-phenyl-4-benzyl-5-pyrazolone 3-phenyl-4-benzyl-2-pyrazolin-5-one was prepared from ethyl-α-benzoyl-β-phenylpropionate and hydrazine according to the method of Gagnon, Boivin, and Paquin (Can. J. Chem. 31, 1025, 1953). To a solution of 2.94 gm. (0.128 mole) sodium in 200 ml. anhydrous ethanol was added with stirring 16 gm. (0.064 mole) 3-phenyl-4-benzyl-2-pyrazolin-5-one followed by 11.4 gm. (0.064 mole) 6-methyl-2-picolyl chloride hydrochloride. The mixture was stirred at room temperatures for 30 minutes, then refluxed for 3 hours. The sodium chloride which had formed during the reaction was filtered off and the solution evaporated to dryness in vacuo from a water bath. The residue was taken up in water and neutralized with HCl. A light yellow resinous material separated. It was dissolved in a small volume of benzene and twice the volume hexane added. On standing in a refrigerator, a mixture of crystals and oil separated which solidified in the course of 5 days; M.P. unsharp, 97–112°. After crystallization from ethanol in which the low melting compound is very soluble, the M.P. rose to 165–6°.

$C_{23}H_{21}N_3O$—Mol wt.: 355.42. Calc.: C, 77.72%; H, 5.96%; N, 11.82%. Found: C, 77.66%; H, 6.41%; N, 11.87%.

It will be understood, of course, that the compounds of this invention are useful in the form of salts thereof with pharmaceutically acceptable acids, for example, hydrochloric, sulfuric, citric, tartaric and many of the others customarily employed in pharmaceuticals.

The instant new compounds can be compounded according to known pharmaceutical methods for administration by injection, or in solid form or as liquids, for example, syrups and elixirs, etc. In short, in customary pharmaceutical forms consisting of combination of the active compound and an acceptable vehicle.

The 1-[2-(2-pyridyl)ethyl]-3-benzyl-4-phenyl-5-pyrazolone and the 1-[(2-pyridyl)methyl]-3-phenyl-5-pyrazolone, aforesaid, are particularly noteworthy for their sedative property.

The outstanding sedative property of these compounds is manifested by the following tests procedure: Groups of three mice were injected intraperitonealy with an aqueous solution of the compound to be tested. To prepare the solution, the free base was solubilized by the dropwise addition of 3 N hydrochloric acid. Fifteen minutes after the injection, the mice were put into a circular activity cage (Actophotometer, Metro Industries, Mineola, New York). The movements of the mice therein were measured by the number of times that they interrupted three criss-crossing photoelectric cell light beams. The count was recorded on an automatic counter for 30 minutes. As controls there were used groups of mice which were injected in the same way with saline. By comparison of the count in the case of the mice injected with the compound with the count in the case of the control mice, the percentage decrease in spontanous activity, i.e., the degree of sedation was calculated.

This method is described by L. Cook, E. F. Weidley, R. W. Morris and P. Mattis in Journal of Pharmacology and Experimental Therapeutics, vol. 113, page 11 (1955) and D. H. Tedeschi, R. E. Tedeschi, L. Cook, P. A. Mattis and E. J. Fellows in Archives Internationales de Pharmacodynamie et de Therapie, vol. 122, page 130 (1959).

Tests carried out by the foregoing method showed that a dose of 100 mg./kg. of 1-[2-(2-pyridyl)ethyl]-3-benzyl-4-phenyl-5-pyrazolone reduced spontaneous activity to 19% of normal; and that 1-[(2-pyridyl)methyl]-3-phenyl-5-pyrazolone in similar dose reduced the spontaneous activity to 15% of normal.

For oral administration, the compounds may be put up in the form of tablets as follows:

| No. | Ingredients | Weight per one tablet, mg. |
|---|---|---|
| 1 | 1-(2-pyridylmethyl)-3-phenyl-5-pyrazolone (Example 13). | 100 |
| 2 | Spray dried lactose | 300 |
| 3 | Corn starch | 10 |
| 4 | Magnesium stearate | 4 |
| 5 | Stearic acid | 6 |
|   |   | 420 |

Ingredients Nos. 1, 3, 4 and 5 were passed through a No. 40 mesh sieve, mixed well with the lactose and compressed at 420 mg. tablet weight.

Similar tablets are prepared wherein ingredient 1 is the compound of Example 10.

The tablets aforesaid can also be prepared by the usual wet granulation method.

It will be understood that the foregoing description of the invention and the examples set forth are merely illustrative of the principles thereof. Accordingly, the appended claims are to be construed as defining the invention within the full spirit and scope thereof.

I claim:

1. A sedative composition whereof the dosage form comprises: (I) as a sedatively active component in an effective amount, a compound of the group consisting of (1) a compound having the formula

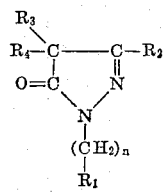

and (2) the acid addition salts of (1) with a pharmaceutically acceptable acid wherein:

$n$ designates a whole number of from 1 to 3;

$R_1$ designates a C-attached member selected from the group consisting of pyridyl and piperidyl;

$R_2$ designates a member selected from the group consisting of H, lower alkyl, phenyl, benzyl, amino and 2,2,2-trichloro-1-hydroxy-ethylamino;

$R_3$ designates a member of the group consisting of H, methyl, phenyl, benzyl and bromo; and $R_4$ designates H, and (II) a pharamceutically acceptable carrier material.

2. A sedative composition whereof the dosage form comprises (I) as a sedatively active component in an effective amount, a member selected from the group consisting of (1) 1-[2-(2-pyridyl)ethyl]-3-benzyl-4-phenyl-5-pyrazolone and 1-[(2-pyridyl)methyl]-3-phenyl-5 - pyrazolone and (2) the acid addition salts of (1) with a pharmaceutically acceptable acid and (II) a pharmaceutically acceptable carrier material.

3. A sedative composition whereof the dosage form comprises: (1) 1-[2-(2-pyridyl)ethyl]-3-benzyl-4-phenyl-5-pyrazolone as the sedatively active component in an effective amount and (2) a pharmaceutically acceptable carrier material.

4. A sedative composition whereof the dosage form comprises: (1) 1-[(2-pyridyl)methyl]-3-phenyl-5-pyrazolone as the sedatively active component in an effective amount, and (2) a pharmaceutically acceptable carrier material.

References Cited by the Examiner

UNITED STATES PATENTS

| 2,903,460 | 9/1959 | Jucker | 167—65 |
| 2,904,549 | 9/1959 | Jucker | 167—65 |
| 2,929,819 | 3/1960 | Erlenmeyer | 260—296 |
| 2,937,118 | 5/1960 | Von Haxthausen et al. | 167—65 |
| 2,998,314 | 8/1961 | Puschel | 96—55 |
| 3,010,827 | 11/1961 | Pelz et al. | 96—66 |
| 3,051,715 | 8/1962 | Biel et al. | 260—294.7 |
| 3,063,902 | 11/1962 | Gray et al. | 167—65 |

OTHER REFERENCES

Agfa: Chem. Abst., vol. 55, p. 5207(h), 1961.
Jucker: Chem. Abst., vol. 56, pp. 1532–1533, 1962.
Pelz: Chem. Abst., vol. 54, 1960, p. 15042.

JULIAN S. LEVITT, *Primary Examiner.*

NICHOLAS S. RIZZO, *Examiner.*